US008473986B2

United States Patent
Elshocht

(10) Patent No.: US 8,473,986 B2
(45) Date of Patent: Jun. 25, 2013

(54) ELECTRONIC PROGRAM GUIDE

(75) Inventor: Olivier Elshocht, Brussels (BE)

(73) Assignee: Sony Europe (Belgium) NV, Londerzeel (BE)

( * ) Notice: Subject to any disclaimer, the term of this patent is extended or adjusted under 35 U.S.C. 154(b) by 280 days.

(21) Appl. No.: 12/887,908

(22) Filed: Sep. 22, 2010

(65) Prior Publication Data

US 2011/0078741 A1 Mar. 31, 2011

(30) Foreign Application Priority Data

Sep. 25, 2009 (GB) .................................. 0916900.4

(51) Int. Cl.
*G06F 3/00* (2006.01)

(52) U.S. Cl.
USPC .................... 725/50; 725/37; 725/39; 725/52

(58) Field of Classification Search
None
See application file for complete search history.

(56) References Cited

U.S. PATENT DOCUMENTS

| | | | | |
|---|---|---|---|---|
| 5,169,342 A | * | 12/1992 | Steele et al. .................. | 434/112 |
| 6,115,080 A | * | 9/2000 | Reitmeier ..................... | 348/731 |
| 6,421,828 B1 | * | 7/2002 | Wakisaka et al. .............. | 725/52 |
| 6,857,128 B1 | * | 2/2005 | Borden et al. .................. | 725/39 |
| 6,983,426 B1 | * | 1/2006 | Kobayashi et al. ........... | 715/854 |
| 2002/0138834 A1 | * | 9/2002 | Gerba et al. .................... | 725/42 |
| 2004/0172651 A1 | | 9/2004 | Wasilewski et al. | |
| 2005/0144638 A1 | | 6/2005 | Allison et al. | |
| 2009/0235309 A1 | * | 9/2009 | Roe ............................... | 725/39 |

FOREIGN PATENT DOCUMENTS

WO  WO 2009/055273 A1  4/2009

* cited by examiner

*Primary Examiner* — Brian Pendleton
*Assistant Examiner* — Jason K Lin
(74) *Attorney, Agent, or Firm* — Oblon, Spivak, McClelland, Maier & Neustadt, L.L.P.

(57) ABSTRACT

An apparatus 100 and method is provided for generating an EPG. The apparatus 100 is configured to output data to generate an EPG in which upcoming programs are shown as tiles with a uniform size, regardless of the duration of the program or how much of the program has elapsed. The EPG also has a highlighted portion that is associated with a particular channel at any given time. When a command is received to move forwards or backwards through the EPG, data is output to move the highlighted portion of the EPG in the corresponding direction. The tiles representing programs in the EPG are also shifted so as to be based on the start time of the next or previous (depending on the user input) program on the channel associated with the highlighted portion.

23 Claims, 11 Drawing Sheets

ELECTRONIC PROGRAM GUIDE

CROSS-REFERENCE TO RELATED APPLICATIONS

This application is based upon and claims the benefit of priority from British Application No. 0916900.4 filed 25 Sep. 2009, the entire contents of which are incorporated by reference.

BACKGROUND OF THE INVENTION

1. Field of the Invention

The present invention relates to apparatus and method for enabling a user to interact with, or control, an electronic device, such as a television. The apparatus and method enables a user to interact with, or control, an electronic device in a more efficient and intuitive manner.

Entertainment systems, such as televisions, are becoming increasingly versatile and powerful. Many entertainment systems now provide the user with the option of performing various different functions. They may enable a user to access a vast quantity of information. For example, an entertainment system might typically give a user access to a vast number of television and/or radio channels, which may be broadcast channels and/or on-demand channels. A typical entertainment system might also be able to provide information about upcoming programs that are scheduled to be broadcast on the available channels.

2. Description of the Related Art

The increase in functionality of entertainment systems, and the associated increase in information and options available to the user of such an entertainment system, requires an improved interface in order to enable a user to control and interact with the entertainment system in an intuitive and efficient manner. Conventionally, apparatus has been developed for enabling a user to interact with an entertainment system, such as a television, through an electronic program guide (EPG). However, this conventional apparatus has resulted in electronic program guides which are not easy to use and which may provide confusing information to a user and/or make control of the entertainment device difficult.

OBJECTS AND SUMMARY OF THE INVENTION

According to the present invention there is provided an apparatus for generating an EPG, the apparatus comprising:

a display generation unit configured to output data for generating an EPG, the EPG including: tiles representing scheduled programs for a plurality of channels, the tiles associated with each channel being arranged sequentially along a direction that represents moving forwards in time, the first tile associated with each channel representing a program that has a start time at or before a reference time and an end time after the reference time, and the other tiles associated with that channel representing subsequent programs; and the EPG further including a highlighted portion which highlights an area of the EPG associated with a first channel; and a user input receiving unit configured to receive an input from a user to navigate through the EPG in a forwards or backwards time direction, wherein, after receiving an input to navigate in a forwards or backwards time direction through the EPG via the user input receiving unit:

the display generation unit is configured to output data to shift the highlighted portion in a direction in the EPG that corresponds to the user-selected forwards or backwards time direction from a rest position to a shifted position;

the display generation unit is configured to output data to scroll the tiles representing programs on the first channel along by one tile in the opposite direction to the user-selected forwards or backwards time direction, and update the tiles representing programs on the other channels displayed by the EPG based on the reference time being the start time of the program represented by the first tile on the first channel after scrolling; and the display generation unit is configured to output data to return the highlighted portion back to the rest position.

According to the present invention there is also provided method of generating an EPG, the method comprising:

generating an EPG that includes: tiles representing scheduled programs for a plurality of channels, the tiles associated with each channel being arranged sequentially along a direction that represents moving forwards in time, the first tile associated with each channel representing a program that has a start time at or before a reference time and an end time after the reference time, and the other tiles associated with that channel representing subsequent programs; and the EPG further including a highlighted portion for highlighting an area of the EPG associated with a first channel;

receiving a user input to navigate through the EPG in a forwards or backwards time direction; and, upon receipt of said user input:

shifting the highlighted portion in a direction in the EPG that corresponds to the user-selected forwards or backwards time direction from a rest position to a shifted position;

scrolling the tiles representing programs on the first channel along by one tile in the opposite direction to the user-selected forwards or backwards time direction, and updating the tiles representing programs on the other channels displayed by the EPG based on the reference time being the start time of the program represented by the first tile on the first channel after scrolling; and returning the highlighted portion back to the rest position.

Such an apparatus and method for generating an EPG has various advantages. For example, it enables the user of an entertainment device that employs the EPG (for example by incorporating the apparatus, interacting with the apparatus, or using the method for generating the EPG) to interact with and/or control the entertainment device in a more efficient and/or intuitive manner. The apparatus and method for generating an EPG may additionally or alternatively allow a user to access information about the entertainment device (such as upcoming program information) in an intuitive and efficient manner.

The display generation unit may be configured to update the tiles representing programs on channels other than the first channel that are displayed by the EPG by, for each channel other than the first channel, outputting data to either:

(i) scroll each tile representing a program scheduled for a particular channel by an integer number of tiles in the opposite direction to the user-selected forwards or backwards time direction; or (ii) leave each tile representing a program scheduled for a particular channel stationary.

This arrangement of apparatus and method enables the user to view which tiles are being moved in order to update the EPG. This provides improved feedback to the user, thereby enabling them to interact with the EPG (and thus entertainment device) more quickly and efficiently.

The display generation unit may be configured to output data to generate an EPG in which the tiles representing programs are always shown in full regardless of how much of the represented program has elapsed at the reference time, unless the display generation unit is outputting data to scroll tiles representing programs in response to receiving a user input to navigate in a forwards or backwards time direction.

In this way, the user can easily understand which programs are being shown on each of the channels represented in the EPG at a given time (for example at the present time). Because all of the tiles are shown regardless of how much of the represented program has elapsed, the user can see all of the information shown on a given tile, which may provide useful information about the program that it represents.

The rest position of the highlighted portion may correspond to the position of the tile representing the earliest program on the first channel.

This is an intuitive position to which a user would naturally refer when interacting with the EPG. In return, this makes control of the entertainment device via the EPG more intuitive.

The shifted position of the highlighted portion may correspond to the position of the second tile on the first channel before scrolling, when the user input is to navigate in a forwards time direction through the EPG.

This arrangement means that the shifted position may be at a position in the EPG which is near to the portion of the EPG that the user is primarily interested, and so it is easy for the user to follow the movement of the EPG without undue effort, in order to be provided with feedback of the time direction in which the EPG is being navigated.

The display generation unit may be further configured to output data to include tiles representing the plurality of channels in the EPG; and the rest position of the highlighted portion may correspond to the position of the tile representing the first channel.

It may be useful to have tiles representing the channels (for example positioned next to the tile representing the earliest program shown on that channel) so that the user can easily understand to which channel a program is associated. In this case, the position of the tile representing the first channel is an intuitive the rest position for the highlighted portion.

The display generation unit may be further configured to output data to include an icon corresponding to a user input to navigate backwards in time through the EPG; and the shifted position of the highlighted portion may correspond to the position of said icon when the user input is to navigate in a backwards time direction through the EPG.

Providing an icon (such as an arrow) corresponding to a user input to navigate backwards in time through the EPG, and having the position of the arrow to be the shifted position of the highlighted portion provides efficient feedback to the user relating to the direction through the EPG in which they are navigating.

The distance between the rest position and the shifted position may be substantially the same as the distance between the centres of neighbouring tiles representing programs on a channel. By way of example only, according to this feature, the distances between the rest position and the shifted position may be within 20%, 10%, 5%, 2%, 1%, 0.5%, 0.1%, or less than 0.1% of the distance between the centres of neighbouring tiles.

This distance may be chosen because the layout of the EPG would typically be such that the user is easily able to perceive and understand information conveyed over such a distance without undue effort.

The display generation unit may be further configured to output data to include tiles representing the plurality of channels in the EPG; and the rest position of the highlighted portion may correspond to the position of the first tile on the first channel, unless the previous user input was to navigate in a backwards time direction in the EPG, in which case the rest position of the highlighted portion corresponds to the position of the tile representing the first channel.

In this way the rest position of the highlighted portion may depend on the previous input. This provides an easy way for the user to understand what the previous input into the EPG was. This may help them to decide, for example, whether to continue navigating though the EPG in that same direction, or to navigate through the EPG in the opposite direction.

The display generation unit may be configured to output data to cause the tiles representing programs to scroll at a time that overlaps with shifting the highlighted portion from the rest position to the shifted position.

This arrangement means that the user can easily understand in which direction the EPG is being navigated (through movement of the highlighted portion) at the same time that it is being updated.

The display generation unit may be configured to output data to cause the tiles representing programs on the first channel to start to scroll substantially at the same time as the highlighted portion starts to be shifted from the rest position to the shifted position. By way of example only, according to this feature, the tiles representing programs on the first channel may start to scroll within 1 second, 0.5 seconds, 0.2 seconds, 0.1 seconds, or less than 0.1 seconds of the time at which the highlighted portion starts to be shifted from the rest position to the shifted position.

This makes the updating process particularly efficient, meaning that the EPG can be updated rapidly.

The display generation unit may be configured to output data to cause the shift of the highlighted portion from the rest position to the shifted position to be completed at substantially the same time as the tiles representing programs on the first channel have stopped scrolling. By way of example only, according to this feature, the shift of the highlighted portion from the rest position to the shifted position may be completed within 1 second, 0.5 seconds, 0.2 seconds, 0.1 seconds, or less than 0.1 seconds of the time at which the tiles representing programs on the first channel have stopped scrolling.

This makes the updating process particularly efficient, meaning that the EPG can be updated rapidly.

The display generation unit may be configured to output data to cause the tiles representing programs on the first channel to start to scroll substantially at the same time as the highlighted portion starts to be returned back from the shifted position to the rest position. By way of example only, according to this feature, the tiles representing programs on the first channel may start to scroll within 1 second, 0.5 seconds, 0.2 seconds, 0.1 seconds, or less than 0.1 seconds of the time at which the highlighted portion starts to be returned back from the shifted position to the rest position.

This means that the shifting of the highlighted portion can be completed before the tiles representing programs are scrolled, enabling the user to appreciate more easily the direction in which the EPG is being updated.

The user input receiving unit may be configured to receive an input to display the EPG; and the display generation unit may be configured such that, when it receives the input to display the EPG via the user input receiving unit, it outputs data to generate an EPG in which the reference time is the current time.

This means that the user can easily access and control programs (and/or information about programs) that may be available on an entertainment device at the current time.

The apparatus may comprise a display device, and the display generation unit may be configured to output the display data to the display device so as to generate an EPG on the display device. Similarly, the method may comprise displaying an EPG on a display device. In this way, the EPG generated by the apparatus or method of the present invention can be viewed by a user.

The apparatus and/or method for generating an EPG according to the present invention may be incorporated into any suitable entertainment device. For example, the apparatus and/or method of generating an EPG according to the present invention may be incorporated into a television set or a set-top box. In this way, the advantages of the present invention may be provided with the entertainment device itself.

The method of generating an EPG described and claimed herein may be provided as a computer program capable of execution by an apparatus for generating an EPG from program information contained in a database, the computer program being configured to cause the method for generating an EPG on execution. The computer program may be stored on a storage medium.

BRIEF DESCRIPTION OF THE DRAWINGS

The invention will be more clearly understood from the following description, given by way of example only, with reference to the accompanying drawings, in which.

DETAILED DESCRIPTION OF THE PREFERRED EMBODIMENTS

Figure 1:
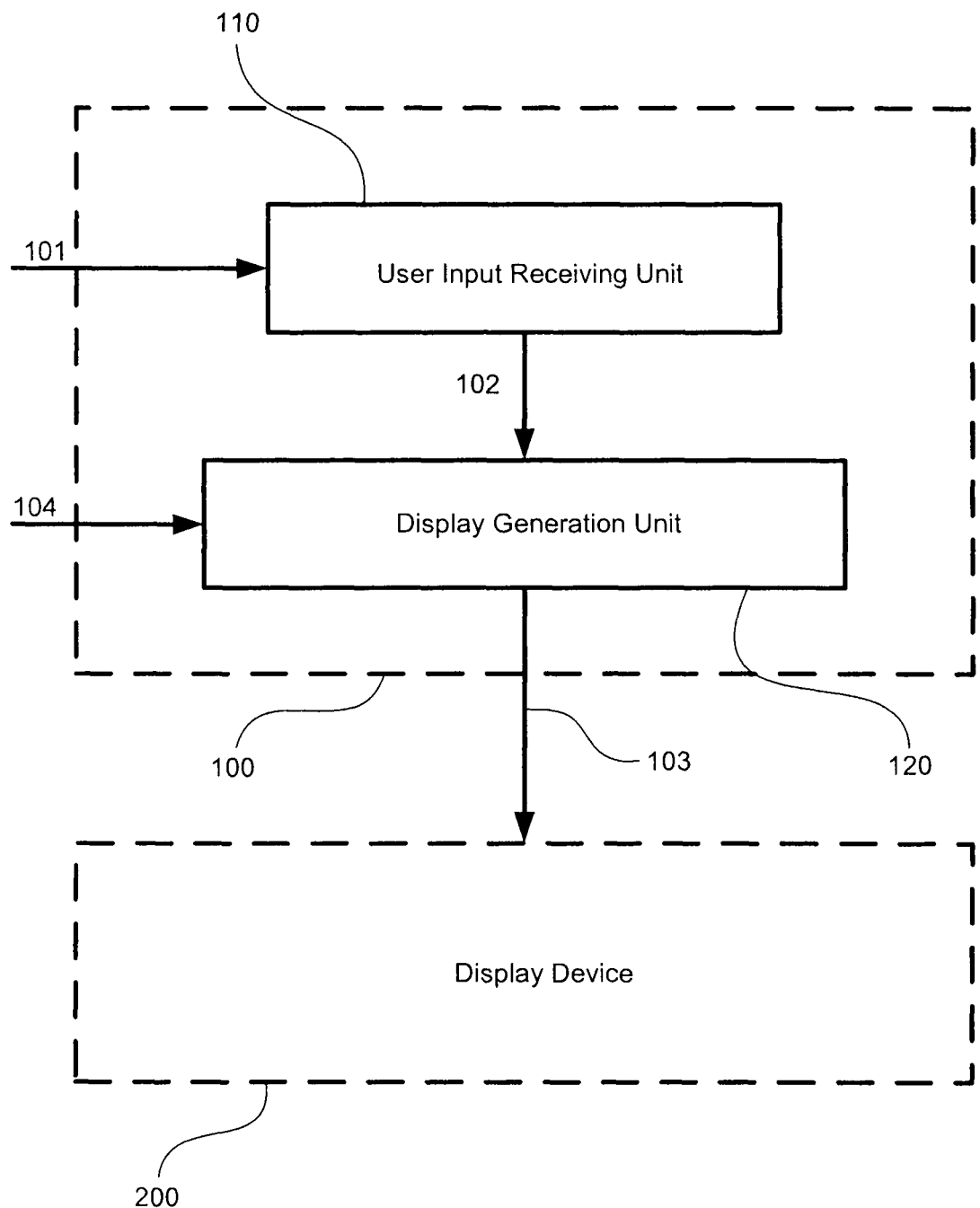
FIG. 1 illustrates the components of an apparatus for generating an EPG according to the present invention.

EPGs are conventionally used, for example in conjunction with a remote control, in order to allow a user to interact with and/or control an entertainment device, such as a television. Apparatus is therefore required in order to generate an EPG. The apparatus may generate the EPG using information regarding, for example, scheduled programs and/or from user input. Increasingly, such an apparatus is required to process the information in a way in which it can generate output data that can be used to generate an EPG that is easy and intuitive for a user to interact with and/or control the entertainment device. Although reference may be made herein to an EPG being used to control and/or interact with a television set, it will be understood that the EPG could be used to control any appropriate entertainment device. As such, references to the term "television set" herein should be taken to refer to any suitable entertainment device. The term entertainment device should include any possible entertainment device that may interact with or via an EPG, or any entertainment device that may be adapted, presently or in the future, to interact with or via an EPG, such as a television set The present invention is concerned with an apparatus and method for generating an EPG that allows a user to interact with and/or control an entertainment device, such as a television, in a more efficient and intuitive manner. The EPG generated by the apparatus and method of the present invention may have a number of tile icons, or other suitable representations, representing upcoming programs that are to be shown on a plurality of channels available on the entertainment device.

The generated EPG also has a highlighted portion. The highlighted portion may be used to highlight an area of the EPG for selection. For example, if the highlighted portion is highlighting a tile representing a particular program, then that program may be selected by the user, for recording, viewing or investigating for further details. The highlighted portion may be associated with a particular channel at any given time.

In an EPG generated according to the present invention, the user may be able to scroll forwards or backwards in time through the EPG so as to obtain information about later, or earlier, scheduled programs. For example, the user may be able to scroll in the forwards or backwards time direction using a remote control. When the user provides an input to move through the EPG in either a forwards or backwards time direction, the EPG is configured to shift the highlighted portion in a corresponding direction. This provides visual feedback to the user to confirm that an input to move in the desired direction through the EPG has been received. As such, the highlighted portion moves from an original rest position to a shifted position upon receiving an input from a user to scroll in the desired forwards or backwards time direction. The direction in which the highlighted portion moves may thus correspond to the time direction in which the user wants to move through the EPG. Once the highlighted portion has moved to the shifted position, it then returns, or springs, back to the original rest position to await further user input.

During the process of shifting the highlighted portion from the original rest position to the shifted position and then back to the rest position, the EPG generated by the present invention is configured to shift the tiles representing programs on the various channels to update to an earlier or later time. The tiles representing programs on a channel to which the highlighted portion corresponds may be shifted along by one tile, such that the earliest program represented for that channel in the EPG becomes either the subsequent or previous program, depending on whether the user provided an input to move forwards or backwards through the EPG respectively. At the same time that the tiles (or other icons) representing programs on a channel corresponding to the highlighted portion are shifted by one tile, the tiles representing programs on other channels that are displayed in the EPG may also be shifted as required for the EPG to be based on the start time of the earliest program represented in the EPG on the channel that corresponds to the highlighted portion. This may mean that the tiles representing programs on each of the other channels are shifted, if required, such that the start time of the earliest program represented in the EPG for each of the displayed channels is either at or before the start time of the earliest program on the channel corresponding to the highlighted portion. In addition, after the EPG has been updated, the end time of the earliest program represented in the EPG for each of the displayed channels may also be after the start time of the earliest program on the channel corresponding to the highlighted portion.

Thus, the EPG generated by the apparatus and/or method of the present invention enables a user to scroll forwards or backwards through it by shifting tiles representing programs as appropriate. At the same time the EPG provides clear feedback of the time direction through which the EPG is being moved via the motion of the highlighted portion. Various features and/or options fall within the scope of the present invention, some of which are discussed in greater detail in relation to the embodiments shown in FIGS. 2 to 11.

FIG. 1 shows an apparatus 100 for generating an EPG according to the present invention. The apparatus 100 is configured to output data 103 which may be used to generate an EPG. For example, in the embodiment shown in FIG. 1, the output data 103 is output from the apparatus 100 to a display device 200. Some embodiments may include the display device 200, and some embodiments may not.

The apparatus 100 comprises a user input receiving unit 110 and a display generation unit 120. The user input receiving unit 110 is configured to receive an input 101 from a user. The input 101 may be any input that enables the user to control and/or interact with the EPG in order to control and/or interact with the entertainment device. As will be explained below in relation to the present invention, an input 101 that the user may make to the apparatus for generating an EPG 100 via the user input receiving unit 110 may be an input to move forwards or backwards in time through the EPG.

The display generation unit 120 is configured to output data to generate the EPG. The details of the EPG produced by the display generation unit are discussed herein. The display generation unit 120 may be configured to output data to generate any suitable EPG, and is not limited to the form and/or layout of the EPGs described herein. The display generation unit 120 is also configured to receive a signal, for example a control signal 102, from the user input receiving unit. The signal 102 received by the display generation 120 from the user input receiving unit 110 may be used by the display generation unit 120 to change (for example update) and/or generate the EPG by outputting the data 103.

The information 104 about the upcoming programs that is used by the display generation unit 120 may be stored in an EPG database. The EPG database may be integrated into the display generation unit 120, or maybe separate from it. The information 104 used, for example, to populate the EPG database may be from data carried in Service Information in Digital Television transmissions. For DVB broadcasts such information may be in the Event Information Table (EIT). EIT may be carried some or all of the broadcast channels (services) on one or more channel (services) known as cross-carried EPG data. Present/Following EPG data may also be broadcast for now and next available programs (events). This can be more accurate as it is updated more frequently and may also be used in the EPG database of the present invention. Alternatively the EPG database may be populated by a service provider using an alternative network connection to the broadcast network (e.g. an internet connection). In some embodiments thumbnails moving video clips corresponding to scheduled programs may be provided via the alternative network connection and identified by event identifiers corresponding to those in broadcast EPG data in order to relate two or more sources of data to one another. Alternative identifiers are possible. Thumbnails and video clips may also be delivered via the broadcast network.

Figure 2:
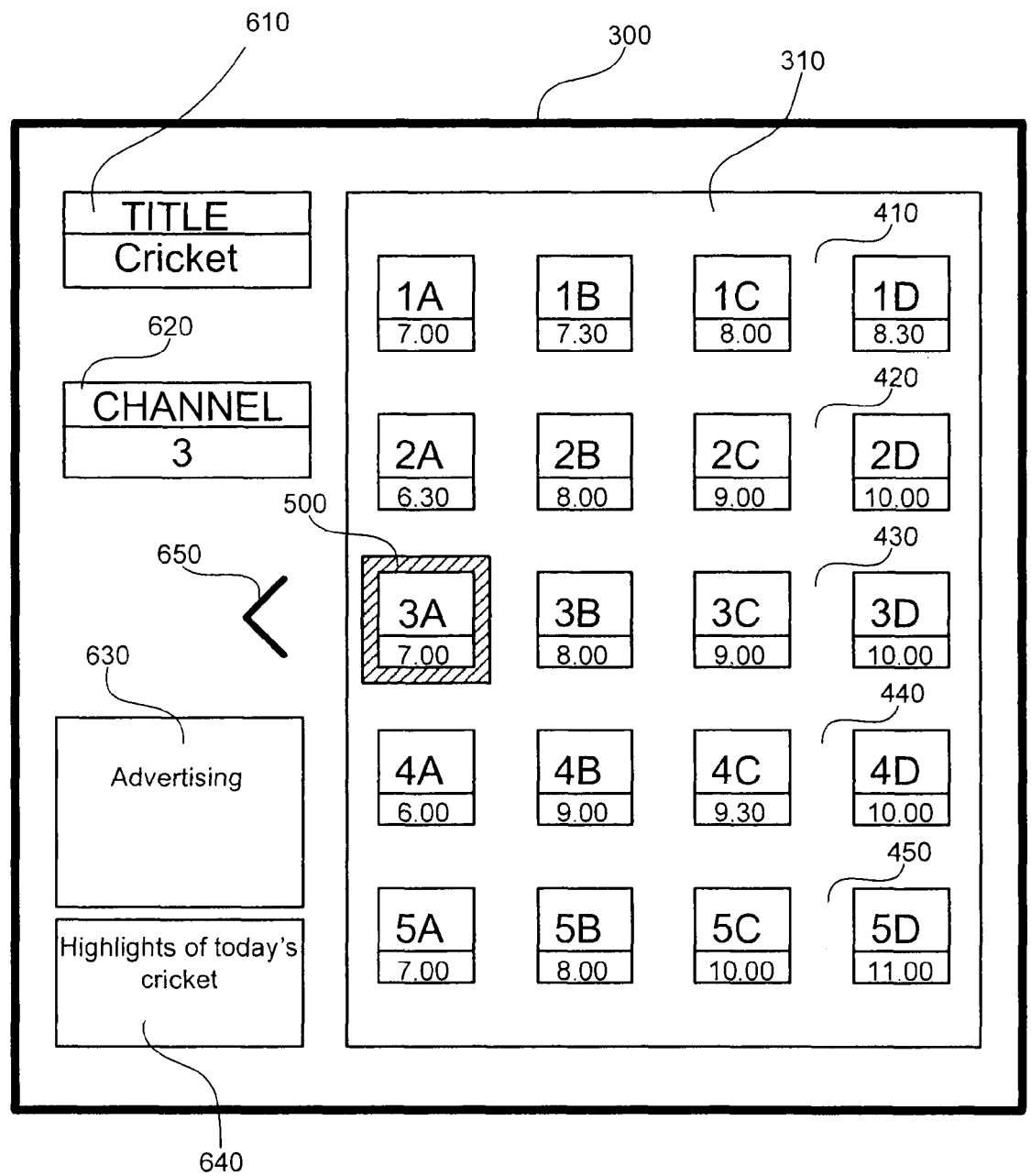
FIG. 2 illustrates an EPG at a first time, the EPG being generated by an apparatus or method according to an embodiment of the present invention.

FIG. 2 shows an example of an EPG 300 that may be generated from output data 103 from the display generation unit 120 according to an illustrative embodiment of the invention. The EPG 300 has an upcoming schedule display portion 310. In the upcoming schedule display portion 310 a number of tiles 1A-5D are shown. Each tile represents a program that is scheduled to be displayed on a particular channel. The tiles 1A-5D may take any suitable form. For example, they may simply be a list of the upcoming programs in alphabetical and/or numerical order, such as the labels 1A-5D shown in the example of FIG. 2. Alternatively, the tiles 1A-5D may have the name of the program written on them. Alternatively or additionally, each tile 1A-5D may have an image, motif, or icon which represents the program scheduled to be shown and/or the channel on which it is to be shown. Additionally or alternatively, each tile 1A-5D may have a moving image, such as movie clip, that is related to the scheduled program and/or the channel which it is displayed. As shown in the example of FIG. 2, each tile 1A-5D may have the start time of the program represented by the tile included in the tile. Alternatively or additionally, the start time, end time, and/or duration of the programs may be included in each of the tiles 1A-5D.

As shown in FIG. 2, the size of each tile 1A-5D may be the same irrespective of the duration of the program it represents. Thus, for example, the tile 1A is the same size as the tile 2A even though the program represented by the tile 1A is 30 minutes in duration, whereas the program represented by the tile 2A is 1 hour and 30 minutes in duration.

In the example shown in FIG. 2, programs on five different channels (channels 1-5) are represented. For each channel, icons representing the next four programs to be shown are displayed in the EPG. The programs 1A-1D to be shown on a first channel 1 are given in a first row 410. The programs 2A-2D to be shown on a second channel 2 are shown in a second row 420. The programs 3A-3D to be shown on a third channel 3 are shown in a third row 430. The programs 4A-4D to be shown on a fourth channel 4 are shown in a fourth row 440. The programs 5A-5D to be shown on a fifth channel 5 are shown in a fifth row 450.

Other embodiments may have different arrangements of icons representing upcoming programs. For example, tiles representing programs on fewer than 5 (for example 1, 2, 3 or 4), channels on greater than 5 (for example 6, 7, 8, 9, 10 or more than 10) channels may be displayed in the upcoming scheduled display portion 310 of the EPG 300. Additionally or alternatively, fewer than 4 (for example 1, 2 or 3) tiles representing upcoming programs, or greater than 4 (for example 5, 6, 7, 8, 9, 10 or more than 10) tiles representing upcoming programs may be displayed for each channel.

Icons representing channels may also be provided. These may be provided next to the icons representing the programs for each particular channel. For example, the icons may show the channel logo, a motif, and/or a movie clip representing the channel. Such an arrangement is described in relation to FIGS. 7-11 below with regard to moving backwards in time through the EPG. However, such an EPG including icons representing the channels themselves may be output by the apparatus and for/or method of any embodiment of the present invention.

The EPG 300 also has a highlighted portion 500. The highlighted portion 500 could take any suitable form. In the embodiment shown in FIG. 2, and described herein, the highlighted portion comprises a shaded area that fits around a tile. The highlighted portion could comprise any shape. The shape may be darker, or brighter, than the surrounding EPG, for example, darker than or brighter than the background of the EPG. Thus, references to a highlighted portion herein do not necessarily mean that the portion is brighter than its surroundings: it may be distinguished from its surroundings in any suitable way. The highlighted portion 500 may comprise a border and/or frame which may fit around a tile or icon. The border and/or frame may be brighter or darker than the surrounding background. The highlighted portion 500 may cause a particular tile to be highlighted or shaded, for example relative to the background of the EPG. The highlighted portion 500 may be approximately the same size as a tile or icon. The highlighted portion 500 may cause substantially all of the tile or icon to be highlighted. By way of example only, according to this feature, 75%, 90%, 95%, 99%, or more than 99% of the tile or icon may be covered.

The highlighted portion 500 may have a rest position. For example, in FIG. 2, the highlighted portion is in a rest position in which a tile 3A is highlighted. In this way, the highlighted portion 500 may be used to highlight an icon representing a particular program when in the rest position. When that icon is highlighted, a selection may be made, for example using a remote control, relating to the program represented by the icon. For example, the program may be selected for viewing, recording, or investigating to find out further information.

The highlighted portion 500 is associated with a particular channel. In the example shown in FIG. 2, the highlighted portion 500 is associated with channel 3, and the programs to be shown on channel 3 are represented the icons 3A-3D in row 430. The channel to which the highlighted portion is associated may be changed, for example through user input which may be via a remote control. For example, the user may input a command 101 to re-centre the EPG 300 around channel 2, rather than channel 3. In this case, the highlighted portion 500 may remain stationery on the screen, whilst the tiles representing programs move or scroll, downwards such that channel 2 is shown in the third row 430 down from the top. In some embodiments, the highlighted portion 500 may initially move in the direction of the channel which is to become associated with it (for example upwards in the example in which the EPG is to be re-centred around channel 2) before returning to its original, rest, position.

In the example shown in FIG. 2, the fact that the highlighted portion 500 is associated with channel 3 is shown in the output area 620 of the EPG 300. The title of the program currently highlighted by the highlighted portion 500 is shown in the output area 610. A synopsis, or summary, of the program associated with the highlighted icon is given in the output area 640. Another output area 630 may be provided for other purposes, for example to advertise products which may be related to the program represented by the tile 3A that is highlighted by the highlighting portion 500. Of course, the exact layout, and presence or lack thereof, of the output areas 610, 620, 630 and 640 may be different according to EPGs produced by different embodiments of the invention.

The EPG 300 also has an arrow 650 pointing in a backwards time direction. The significance of this arrow 650 will be understood in greater detail in relation to an input to move backwards in time through the EPG as described in relation to FIGS. 7-11.

The start time of the earliest program represented by a tile in the EPG on the channel to which the highlighted portion is associated may become a reference time for the EPG. The tiles representing programs on the other channels may be arranged relative to this reference time. For example, as shown in FIG. 2, the tiles representing programs on the other channels are arranged such that the first tile for each channel (i.e. the tile representing the earliest scheduled program) may represent a program that starts either at or before the start time of the program represented by the presently highlighted icon, and finishes after the start time of the program represented by the presently highlighted icon. In the example shown in FIG. 2, the reference time is 7.00 pm, because the program represented by tile 3A starts at 7.00 pm. Thus, the programs represented by the first (i.e. left most) tiles 1A, 2A, 4A, 5A on the other channels all start either at or before 7.00 pm and finish after 7.00 pm.

As noted previously, each tile 1A-5D in the EPG 300 of FIG. 2 has the same size regardless of what proportion of the program represented by the tile has elapsed at the reference time. Thus, even though ⅓ of the program represented by the tile 2A has elapsed at the reference time 7.00 pm shown in FIG. 2, the full tile 2A is still displayed.

Figure 3:
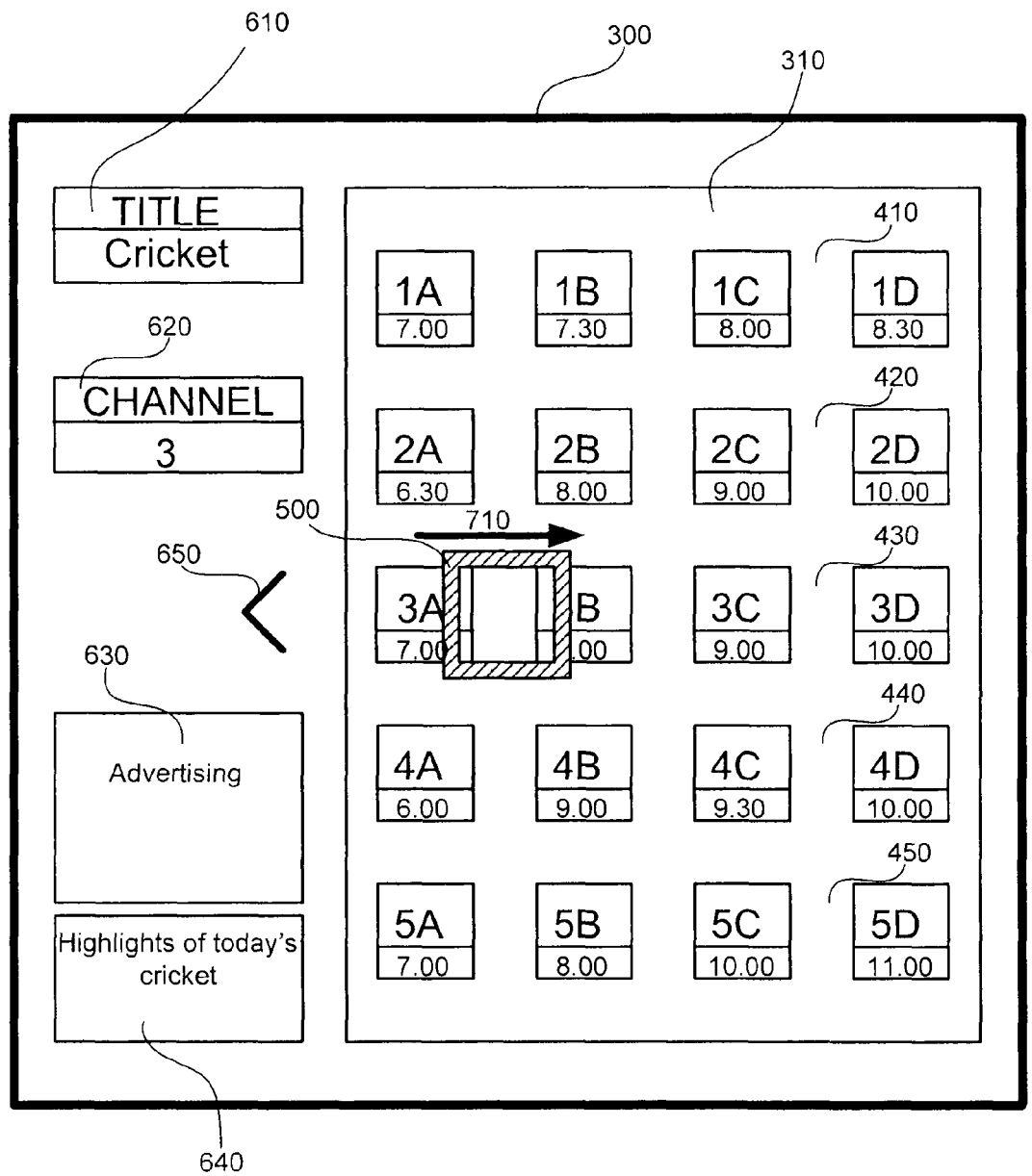
FIG. 3 illustrates a snapshot of the EPG of FIG. 2 after receiving a user input to navigate forwards in time through the EPG, the EPG being generated by an apparatus or method according to an embodiment of the present invention.

FIG. 3 shows how the EPG described above in relation to FIG. 2 may appear at some point after receiving a user input to move forward in time through the EPG. The user input 101 may be received by the user input receiving unit 110. The user input may be made, for example, for a remote control that is used to interact with the entertainment device, for example via the EPG. As shown in FIG. 3, the highlighted portion 500 moves in the direction of the arrow 710 shown in FIG. 3 when the user input to move forward in time through the EPG is received. The movement of the highlighted portion 500 may thus move from the rest position shown in FIG. 2 in a direction 710 that corresponds to the user-selected forwards or backwards time direction. As such, in the example shown in FIG. 3, the user input received by the user input receiving unit 110 is to move forwards in time, and as such the highlighted portion 500 moves in a forward time direction through the EPG. It will be understood that FIG. 3 is a snapshot at a point in time after receiving the user input to move forwards in time, and demonstrates the movement of the highlighted portion 500. The movement of highlighted portion 500 may, for example, be continuous from the rest position shown in FIG. 2 to the shifted position shown in FIG. 4. As such, the motion of the highlighted portion 500 may be a scrolling motion.

Figure 4:
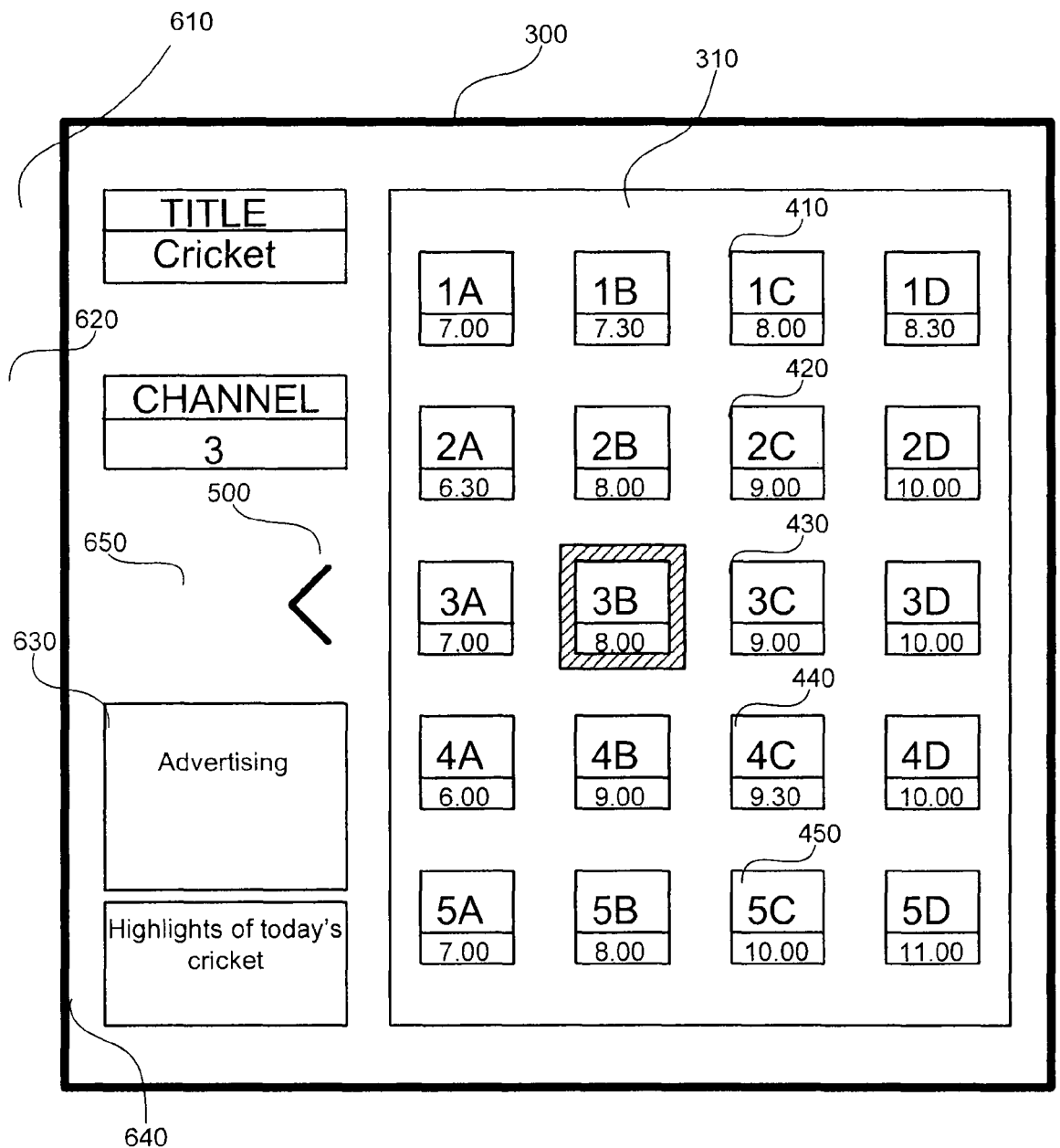
FIG. 4 illustrates a snapshot of the EPG of FIG. 2 and FIG. 3 after the snapshot of FIG. 3, the EPG being generated by an apparatus or method according to an embodiment of the present invention.

In the example of FIGS. 3 and 4, the rest of the EPG remains unchanged during this motion of the highlighted portion 500 from the rest position shown in FIG. 2 through to the shifted position shown in FIG. 4. As such, the tiles 1A-5D representing programs in the EPG remain unchanged as the highlighted portion 500 moves from the rest position shown in FIG. 2 to the shifted position shown in FIG. 4 in the embodiment of FIGS. 2-5. However, in other embodiments, the tiles 1A-5D may scroll as required in order to update the EPG at the same time (and/or and overlapping time) that the highlighted portion 500 moves from the rest position of FIG. 2 to the shifted position of FIG. 4. Thus, for example, the tiles may move in the manner described below in relation to FIG. 5 at the same time as the highlighted portion 500 moves from the rest position of FIG. 2 to the highlighted position of FIG. 4 in an alternative embodiment. In such an alternative embodiment, the tiles 3A-3D, and at least some of the other tiles representing programs in the EPG, may move in the opposite direction to arrow 710 at the same time that the highlighted portion 500 moves in the direction of arrow 710.

FIG. 4 illustrates a snapshot of the EPG shown in FIGS. 2 and 3 at a time subsequent to the time of the snapshot shown in FIG. 3. In FIG. 4, the highlighted portion 500 is at rest, at least momentarily, in a shifted position. In the embodiment shown in FIG. 4, the shifted position is, or corresponds to, the position of the second tile 3B along in the forward time direction on the channel 3 with which the highlighted portion 500 is associated. This shifted position shown in FIG. 4 is the shifted position when the user input is to move forward in time through the EPG. As described below in relation to FIGS. 7-11, the shifted position may be different if the user input is to move backwards in time through the EPG.

Figure 5:
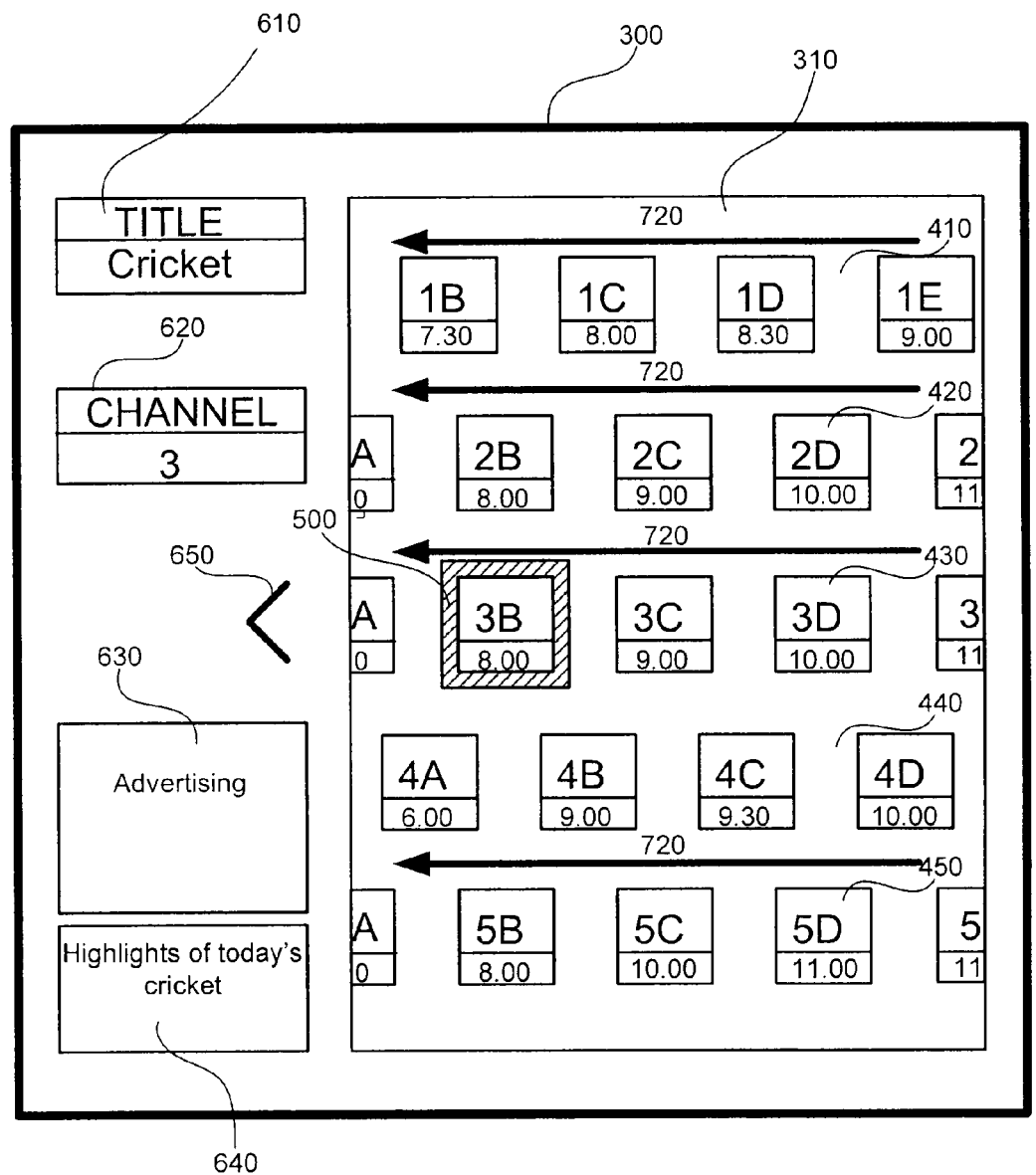
FIG. 5 illustrates a snapshot of the EPG of FIGS. 2-4 when it is being updated to a later time, the EPG being generated by an apparatus or method according to an embodiment of the present invention.

FIG. 5 shows a snapshot of the embodiment of EPG of FIGS. 2-4 at a time after receiving a user input to move forwards in time through the EPG at a time that is subsequent to that of the snapshot of FIG. 4. In FIG. 5, the EPG is being updated to correspond to, or be based on, the start time of the program directly subsequent to the original program associated with the highlighted portion 500 before the user input 101 to move forwards in time through the EPG was received. As such, the EPG is being updated in FIG. 5 so as to be based on the start time of the program represented by tile 3B i.e. 8.00 pm. The program represented by the tile 3B is the next program to be shown on the same channel 3 after the program represented by tile 3A that was originally highlighted by the highlighting portion 500.

FIG. 5 represents a snapshot of the EPG during the updating process. In FIG. 5, the tiles representing programs on the channel 3 associated with the highlighting portion 500 are being scrolled along by one tile in the direction 720 that is opposite to the direction 710 in which the highlighting portion 500 was shifted in FIG. 3 from the rest position of FIG. 2 to the shifted position of FIG. 4. Thus, the tiles 3A-3E representing programs on channel 3 (i.e. the channel associated with the highlighting portion 500) are shifted in the opposite direction to the direction in which the user wants to move through the EPG as received by the user input 101. This is true regardless of whether the received input 101 was to move forwards in time or backwards in time through the EPG. In the example shown in FIG. 5, the user input 101 was to move forwards in time through the EPG, so the tiles 3A-3E are shifted by one tile in the direction 720 that points backwards in time in the EPG.

In order to update the rest of the EPG to correspond to the start time of the program 3B (i.e. 8.00 pm) tiles representing programs on channels other than the channel associated with the highlighting portion 500 may also be shifted. The shifting of these other tiles is in the same direction as the direction 720 that the tiles 3A-3E on the channel associated with the highlighting portion 500 are shifted. Thus, in the example shown in FIG. 5, the tiles representing programs on channels 1, 2, and 5 are also being scrolled in addition to the tiles representing programs on channel 3. The tiles 4A-4D representing programs on channel 4 are not being shifted in the example of FIG. 5. This is because the start time of the program 4A is before the start time of both programs 3A and 3B and the end time of the program 4A is after the start time of both programs 3A and 3B. Thus, the tiles 4A-4D in the row 440 of the EPG do not need to be changed when the EPG is updated to be based on the start time of the program represented by tile 3B rather than the start time of the program represented by tile 3A.

The tiles representing programs on channel 2 (in row 420) and channel 5 (in row 450) are shifted along by one tile in the direction of arrow 720. This is because the start time of the programs represented by tiles 2B and 5B (i.e. the next programs to be shown) are the same as the start time of the program represented by the tile 3B. The tiles representing programs on channel 1 (in row 410) are shifted along by two tiles in the direction of arrow 720. This is because, on channel 1, it is the program represented by tile 1C that needs to be the tile shown first in the row 410 representing channel 1 in order for that row 410 to be updated to be based on the start time 8.00 pm of the program represented by tile 3B.

In general terms, the tiles representing programs on any channel other than the channel associated with the highlighted portion are either left stationary (as in the case of row 440 in FIG. 5), or are shifted along by an integer number of tiles. The number of tiles by which the tiles representing programs on any given channel are shifted is such that the earliest program represented by a tile after shifting has a start time that is at or before, and a finish time that is after, the start time of the earliest program represented by a tile on the channel associated with the highlighted portion.

The shifting of the tiles may be any appropriate motion, for example a step motion or a scroll motion. In the case that the tiles are scrolled, the scroll rate of the tiles on any given channel may be proportional to the number of tiles that are being shifted. For example, in the embodiment shown in FIG. 5, the scroll rate of the tiles 1A-1E in row 410 may be twice the scroll rate of the tiles 2A-2E in row 420 because two tiles are being scrolled through in row 410 whereas only one tile is being scrolled through in row 420. Alternatively, the scroll rate of each of the tiles may be independent of the number of tiles being scrolled for a particular channel. In this case, the duration of scrolling may be proportional to the number of tiles being scrolled.

In the embodiment shown in FIG. 5, the highlighted portion 500 is being scrolled in the direction of arrow 720 at the same time (and optionally at the same rate) as the tiles 3A-3E on the channel associated with the highlighted portion 500. The scrolling of the highlighted portion 500 is to return the highlighted portion 500 from the shifted position of FIG. 4 to the rest position of FIG. 6 (which is the same as the rest position of FIG. 2). In the embodiment of FIG. 5, the shifting of the tiles may start substantially at the same time as the highlighted portion 500 is shifted back from the shifted position to the rest position. However, this need not necessarily be the case. As mentioned above, in other embodiments the tiles may be shifted whilst the highlighted portion 500 is shifted from the original rest position of FIG. 2 to the shifted position of FIG. 4.

Any possible timing and/or relative timing of the scrolling of the highlighted portion 500 from the rest position to the shifted position and back to the rest position, and the scrolling of the tiles to update the EPG may be used. The speed and/or relative speeds at which the tiles and/or highlighted portion scroll may be fixed, or may be set by the user. For example, the user may set the speed and/or relative speed of the scrolling through an input 101 into the user input receiving unit 110. A typical time taken for the highlighted portion 500 to scroll back from the shifted position to the rest position is in the range of from 0.1 seconds to 5 seconds, preferably in the range of from 0.2 seconds to 2 seconds, preferably in the range of from 0.5 seconds to 1 second. However, any suitable time may be set and/or fixed.

Figure 6:
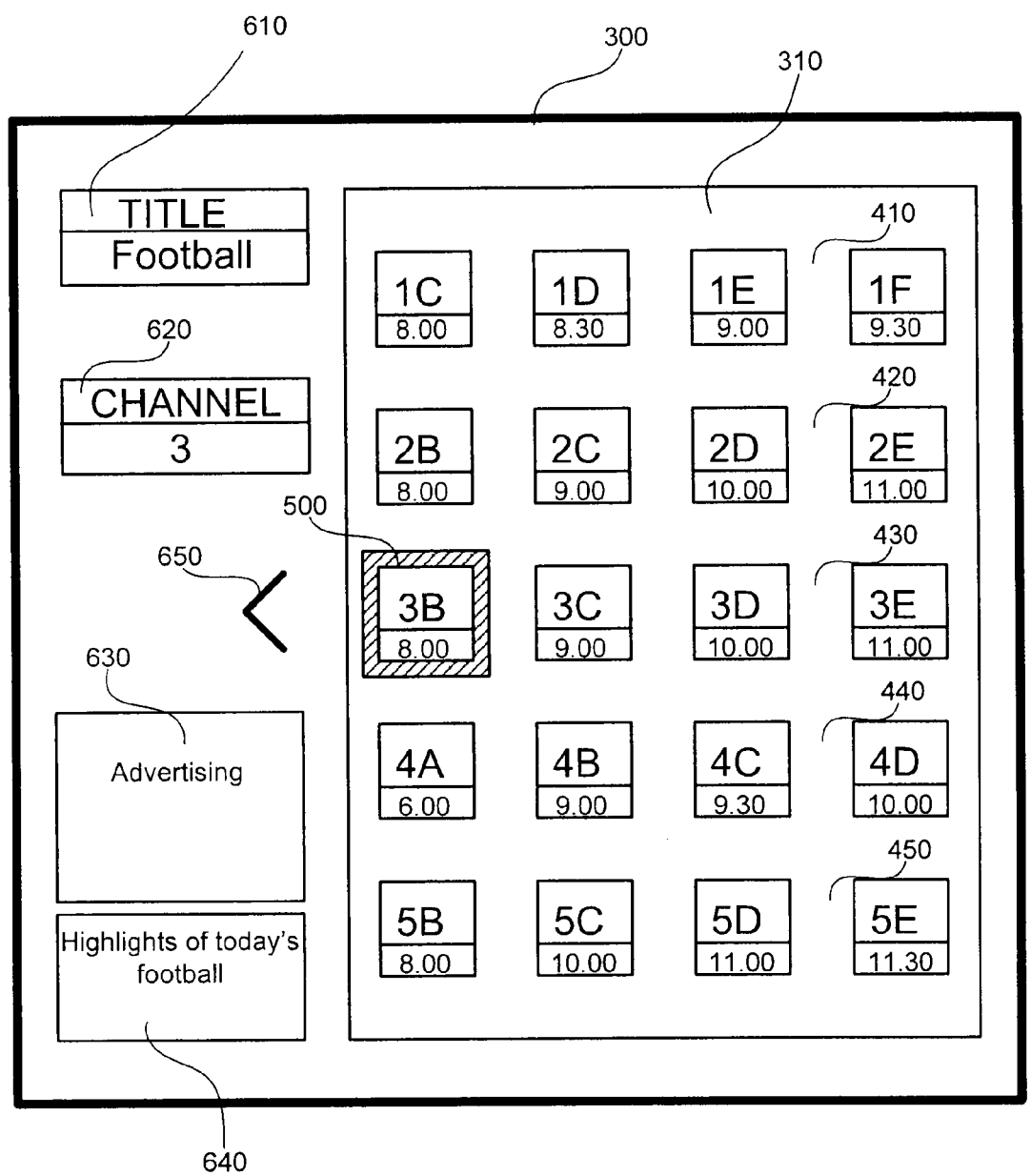
FIG. 6 illustrates the EPG of FIGS. 2-5 after it has been updated to the new time, the EPG being generated by an apparatus or method according to an embodiment of the present invention.

FIG. 6 shows the EPG of FIGS. 2-5 after receiving a user input 101 to move forwards in time through the EPG after the EPG has been updated. As can be seen in FIG. 6, the earliest programs represented by tiles on each of the channels 1-5 are based on the start time of the program represented by tile 3B, i.e. 8.00 pm. The highlighted portion 500 has been shifted back to the same position as the rest position shown in FIG. 2. Thus, the EPG of FIG. 6 appears to be very similar to the EPG of FIG. 2, except that it has been updated to be based on program 3B, rather than program 3A in response to a user input 101 to move forward in time through the EPG.

As shown in FIG. 6, the title of the program shown in area 610 has been updated to show the program represented by tile 3B, rather than the program represented by tile 3A. The updating of portions 610, 620, 630, 640 providing information about the program represented by the tile 3B may be updated at any suitable time, for example during the shifting of the highlighted portion 500 and/or the tiles, or after all of the shifting has been completed.

Figure 7:
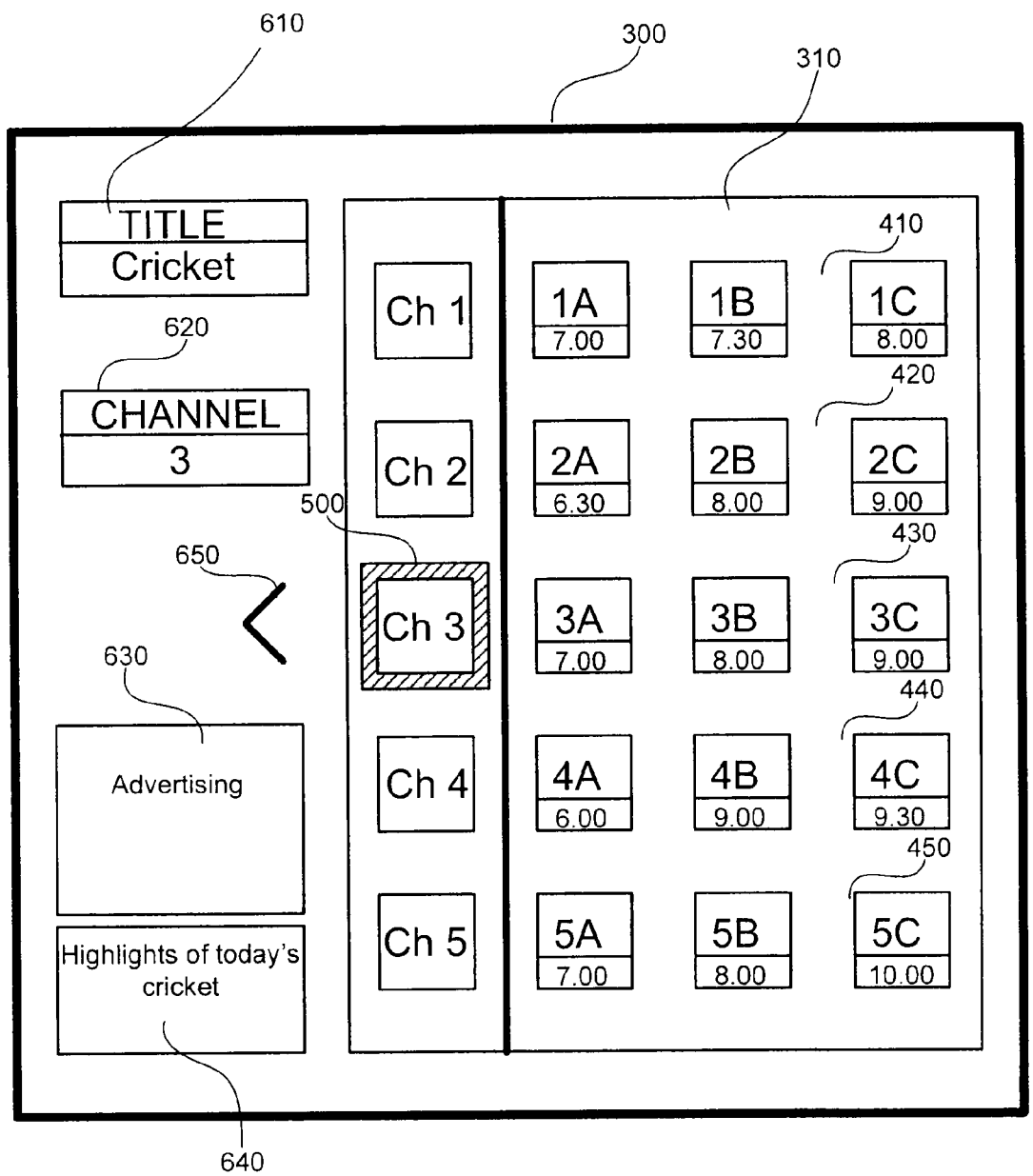
FIG. 7 illustrates an alternative EPG, the EPG being generated by an apparatus or method according to an embodiment of the present invention.

FIG. 7 illustrates an EPG generated by an apparatus or method according to the present invention that has a different layout to the embodiment described in relation to FIGS. 2-6. In the embodiment of FIG. 7, there is a tile in each of the rows 410, 450 that represents the channel on which the programs represented by the icons 1A-5c are to be shown. The tile representing the channel may take any suitable form, for example and icon, a picture, a moving image, or movie clip, or a combination thereof.

In the embodiment of FIG. 7, tiles representing three upcoming programs are displayed for each channel. In alternative embodiments, any number of tiles representing different programs may be displayed for each channel, as with the embodiment shown in FIGS. 2-6. Similarly, although tiles relating to five channels are displayed (in rows 410-450) in the EPG shown in FIG. 7, in other embodiments tiles representing any number of channels may be displayed in the EPG.

In the embodiment shown in FIG. 7, the rest position of the highlighted portion 500 is the channel icon of the channel with which the highlighted portion 500 is associated. Other aspects of the EPG may be substantially similar to those described above in relation to the EPG of FIGS. 2-6, and will not be described further. In some embodiments, the rest position of the highlighted portion 500 may, for example, be the tile representing the first program on the channel associated with the highlighted portion 500, i.e. tile 3A in this case.

Figure 8:
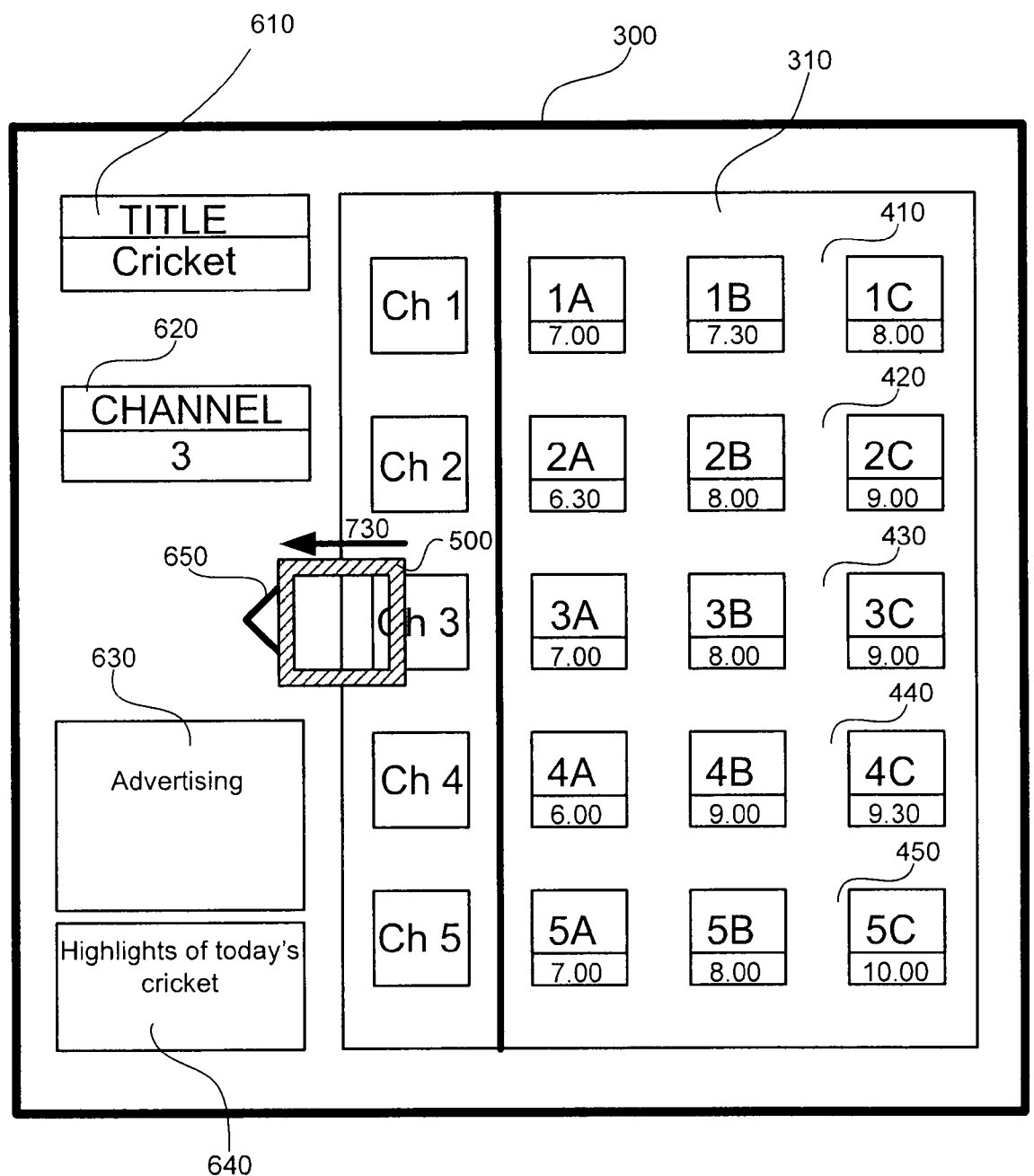
FIG. 8 illustrates a snapshot of the EPG of FIG. 7 after receiving an input to navigate backwards in time through the EPG, the EPG being generated by an apparatus or method according to an embodiment of the present invention.

FIG. 8 shows a snapshot of the EPG at a time after receiving a user input 101 to move backwards in time through the EPG. As illustrated in FIG. 8, the highlighted portion 500 moves, in response to the user input 101, in a direction that corresponds to the direction in time through which the user wishes to navigate the EPG. As such, in FIG. 8, the highlighted portion 500 is shown moving in a backwards direction in time, i.e. in the direction of arrow 730.

Figure 9:
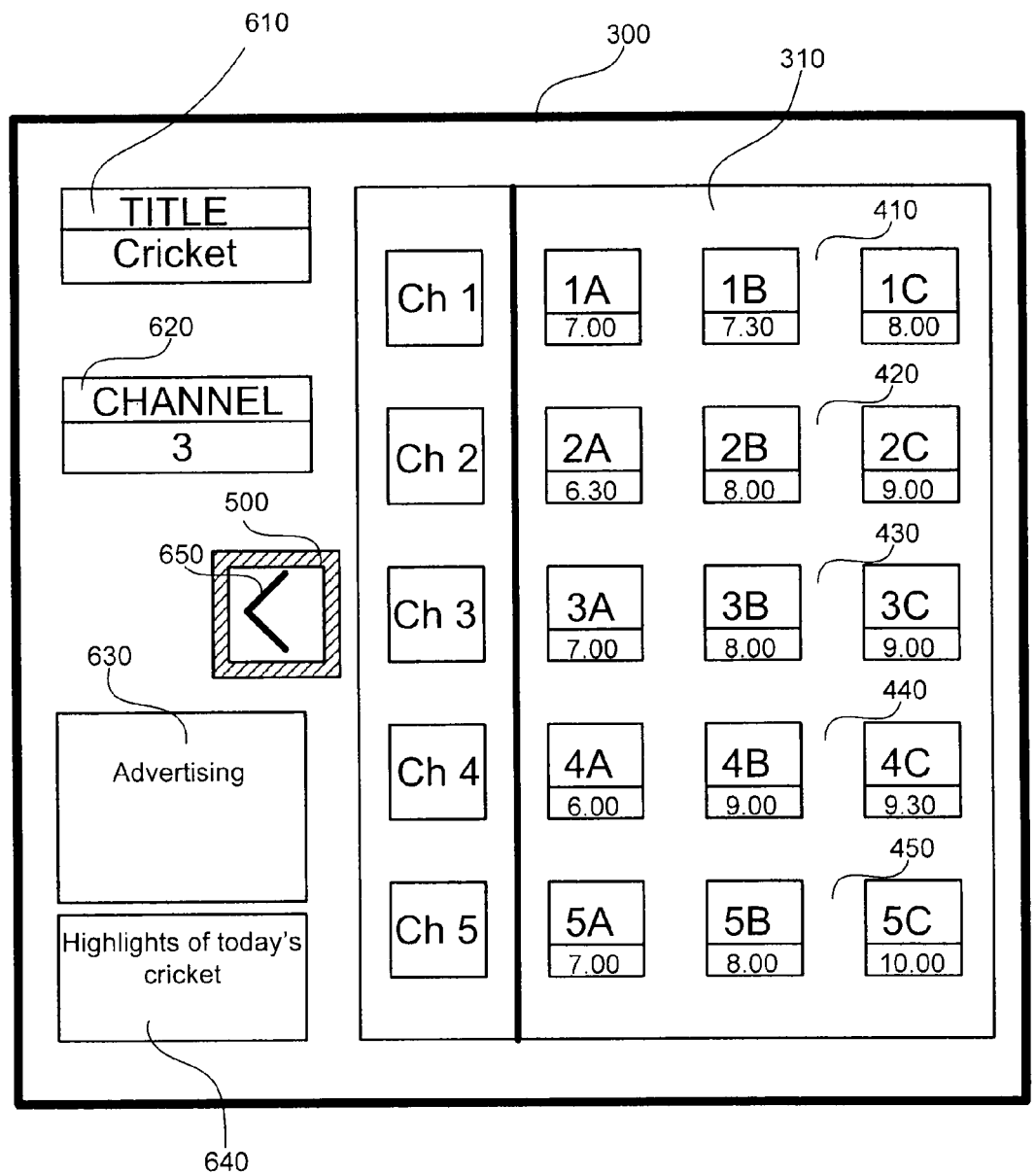
FIG. 9 illustrates a snapshot of the EPG of FIG. 7 and FIG. 8 after the snapshot of FIG. 8, the EPG being generated by an apparatus or method according to an embodiment of the present invention.

FIG. 9 shows a snapshot of the EPG after receiving a user input 101 to move backwards in time through the EPG at a point in time after the snapshot of FIG. 8. In FIG. 9, the highlighted portion 500 is at least momentarily at rest in the shifted position. The shifted position in FIG. 9 is indicated by an arrow that points in a backwards time direction. Of course, the shifted position may be at any suitable position, and may be indicated by a different icon to the backwards facing arrow, or indeed by no icon at all. In an embodiment in which the rest position of the highlighted portion 500 is the first tile 3A, the shifted position in response to an input to move backwards in time through the EPG may, for example, be the position of the tile Ch3 representing the channel.

Figure 10:
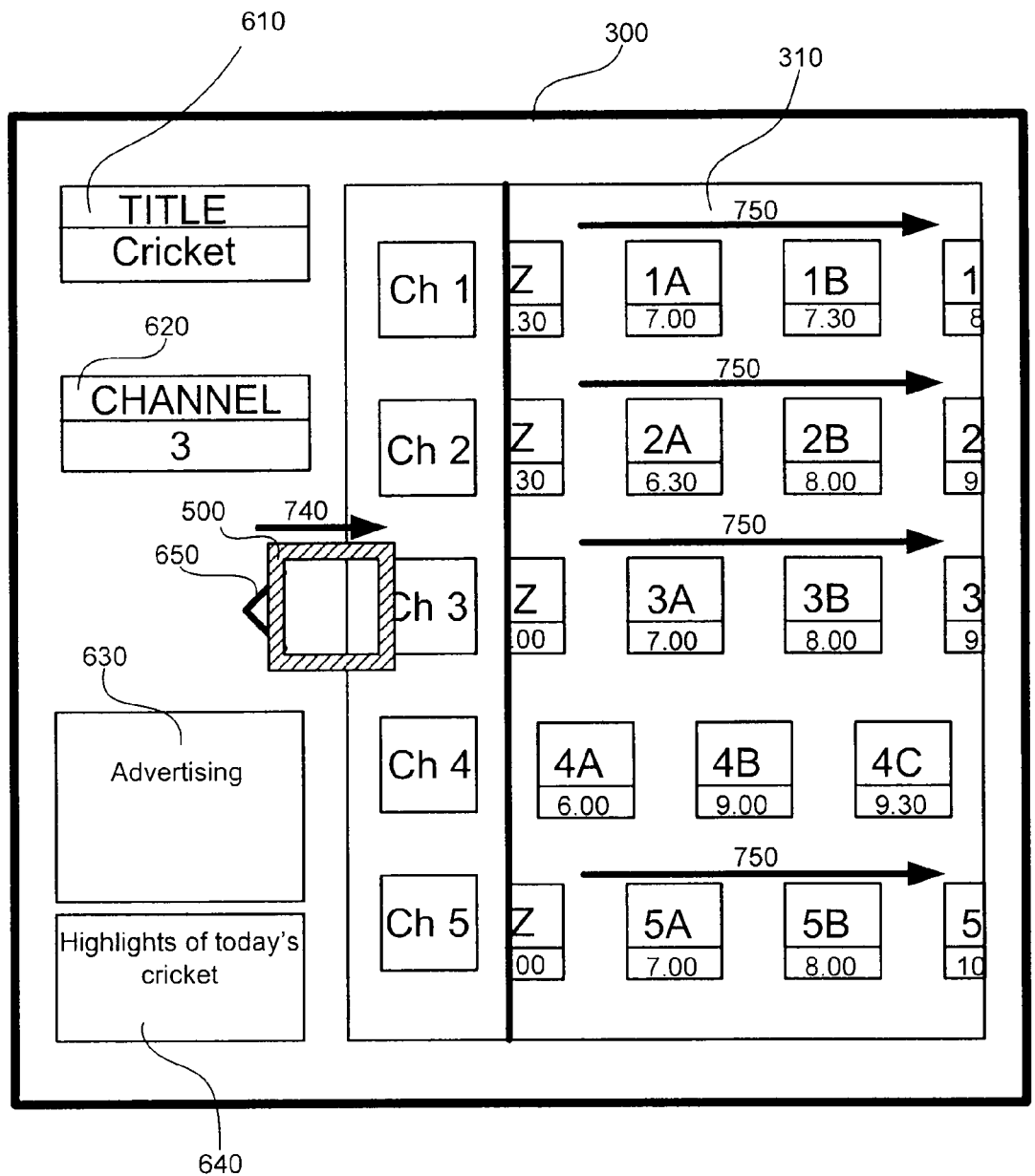
FIG. 10 illustrates the EPG of FIGS. 7-9 being updated to an earlier time, the EPG being generated by an apparatus or method according to an embodiment of the present invention.

FIG. 10 shows a snapshot of the EPG of FIGS. 8 and 9 at a point in time after the snapshot shown in FIG. 10. The snapshot shown in FIG. 10 corresponds to the snapshot shown in FIG. 5, but in FIG. 10 the EPG is being updated to the start time of a previous program whereas in FIG. 5 the EPG is being updated to the start time of a subsequent program. Thus, the comments made above in relation to the movement of the tiles in FIG. 5 may apply to the motion of the tiles in FIG. 10, but in a reverse direction.

The tiles representing programs in FIG. 10 are moving in a direction that is opposite to the user input direction (which was to move backwards in time through the EPG, i.e. in a direction 750 that represents moving forwards in time through the EPG. The start time of the next earliest program (represented by tile 3Z) on the channel to which the highlighting portion 500 is associated is 6.00 pm. Thus, the tiles representing programs on channels other than the channel Ch3 with which the highlighting portion 500 is associated are shifted along by an appropriate number (or left stationary) in the direction of arrow 750. In the example shown in FIG. 10 and FIG. 11, in order to update the EPG, the tiles on channels Ch1, Ch2, and Ch5 all need to be shifted along by one tile so that the start time. After shifting the tiles, the earliest program represented by tiles on those channels is at or before the start time of the program represented by tile 3Z, but the end time is after the start time of the program represented by tile 3Z. The tiles representing programs on channel Ch4 do not need to be shifted because the program represented by tile 4A already has a start time (6.00 pm) that is the same as the start time of the program represented by the tile 3Z.

In the embodiment of FIG. 10, the highlighted portion 500 also shifts in the same direction 740, 750 as the tiles representing programs in the EPG so as to return it from the shifted position to the rest position. The highlighted portion 500 may be moved from the shifted position back to the rest position at the same, or an overlapping, time as the tiles are shifted to update the EPG. However, as described above in relation to moving forwards in time through the EPG, any suitable timing or relative timing of the shifting of the highlighted portion 500 and the tiles representing programs may be used.

Figure 11:
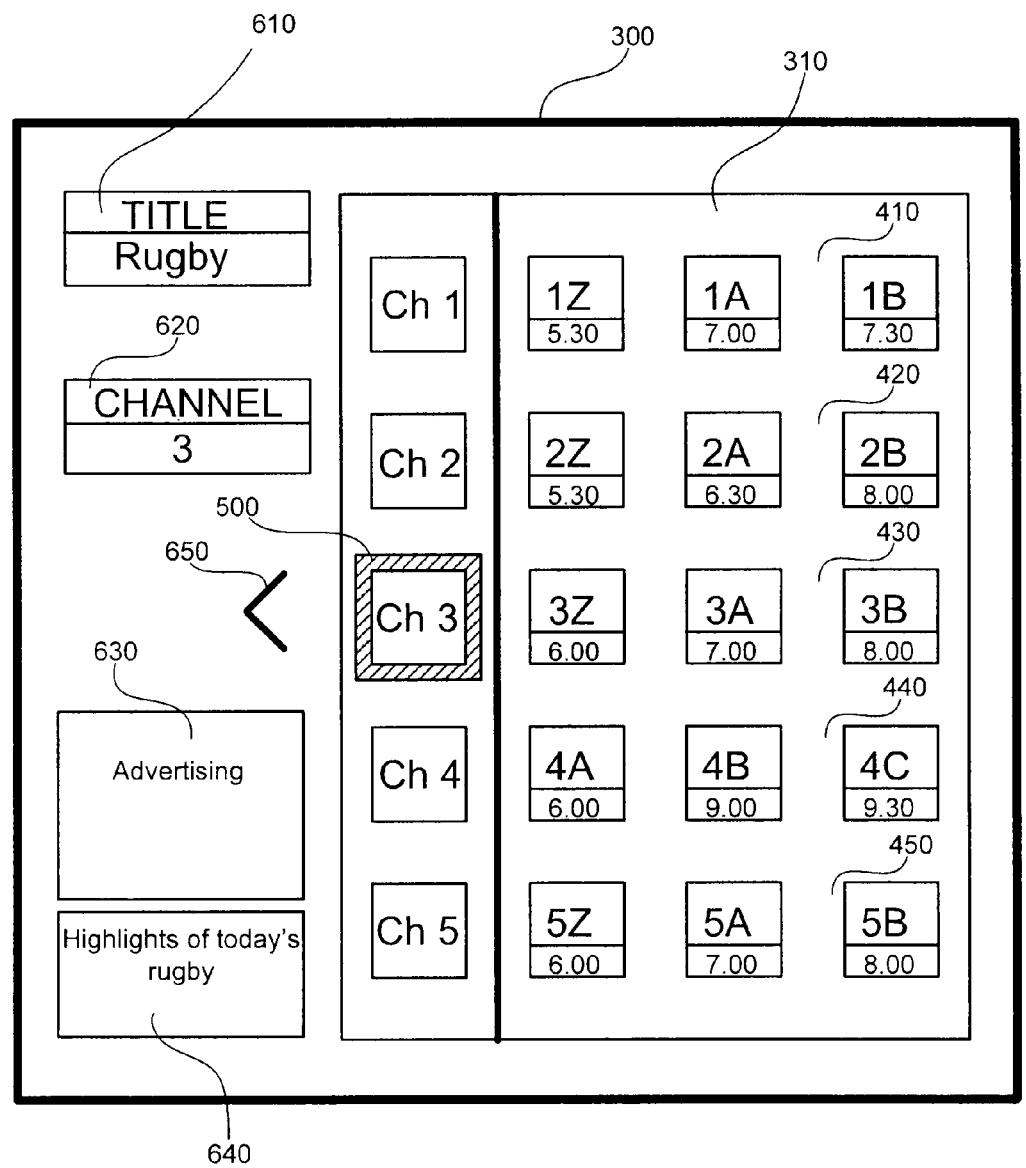
FIG. 11 shows the EPG of FIGS. 7-10 after it has been updated to the earlier time, the EPG being generated by an apparatus or method according to an embodiment of the present invention.

FIG. 11 shows the EPG of FIG. 7 after it has been updated in response to a user input 101 to move backwards in time through the EPG. As can be seen in FIG. 11, the layout of the EPG is then substantially the same as the arrangement before receiving the user input 101 (shown in FIG. 7), but the programs represented by tiles in the EPG are now based on the start time of the previous tile 3Z.

The EPG shown in FIG. 7 is used above to describe updating of the EPG in response to a user input 101 to move backwards in time through the EPG. However, it will be appreciated that it would also be possible to navigate forwards through the EPG shown in FIG. 7 in response to a corresponding user input. In that case, the explanation above in relation to FIGS. 2-6 would apply equally to the embodiment that generates the EPG shown in FIG. 7. When moving forwards through time in the EPG shown in FIG. 7, the rest position of the highlighted portion 500 may be, for example, either the channel icon Ch3 of the icon representing the earliest program 3A on the channel associated with the highlighting portion 500.

As mentioned above, a suitable rest and/or shifted position of the highlighted portion 500 can be chosen. Indeed, even within the same embodiment the rest position (and/or the shifted position) of the highlighting portion 500 may change. For example, if the previous user input 101 were to move backwards in time through the EPG, then the rest position of the EPG shown in FIG. 7 may be the position of the channel icon Ch3. However, if the previous user input 101 were to move forwards in time through the EPG, then the rest position may be the tile 3A representing the earliest program in the EPG. It will be appreciated that the rest and shifted positions of the highlighted portion 500 described herein are merely examples, and any suitable rest or shifted position of the highlighted portion 500 may be used. Similarly, it will be appreciated that data to generate any possible layout, for example of tiles and/or other features, of EPG may be output by the apparatus 100 or method of the present invention.

We claim:

1. An apparatus for generating an Electronic Program Guide (EPG), comprising:
    a display generation unit configured to output data for generating an EPG, the EPG including:
        tiles representing scheduled programs for a plurality of channels, tiles associated with each channel being arranged sequentially along a direction that represents moving forwards in time, a first tile associated with each channel representing a program that has a start time at or before a reference time and an end time after the reference time, wherein at least one start time of a first program on one channel is different from a start time of a first program on at least one other channel, and other tiles associated with that channel representing subsequent programs, and
        the EPG further including a highlighted portion which highlights a tile of a first channel; and
    a user input receiving unit configured to receive a user input to navigate through the EPG in a forwards or backwards direction in increments of one tile,
    wherein, after receiving the user input to navigate in a forwards or backwards direction in increments of one tile through the EPG via the user input receiving unit:
        the display generation unit is configured to output data to shift the highlighted portion in a direction in the EPG that corresponds to the user-selected forwards or backwards direction from a rest position to a shifted position;
        the display generation unit is configured to output data to scroll the tiles representing programs on the first channel by one tile in an opposite direction to the user-selected forwards or backwards direction, and update the tiles representing programs on the other channels displayed by the EPG based on the reference time being the start time of the program represented by the first tile on the first channel after scrolling; and
        the display generation unit is configured to output data to return the highlighted portion back to the rest position after shifting the tiles representing programs on the first channel and updating the tiles representing programs on the other channels.

2. The apparatus according to claim 1, wherein the display generation unit is configured to update the tiles representing programs on channels other than the first channel that are displayed by the EPG by, for each channel other than the first channel, outputting data to either:
    (i) scroll each tile representing a program scheduled for a particular channel by an integer number of tiles in the opposite direction to the user-selected forwards or backwards time direction; or
    (ii) leave each tile representing a program scheduled for a particular channel stationary.

3. The apparatus according to claim 1, wherein the display generation unit is configured to output data to generate an EPG in which the tiles representing programs are always shown in full regardless of how much of the represented program has elapsed at the reference time, unless the display generation unit is outputting data to scroll tiles representing programs in response to receiving a user input to navigate in a forwards or backwards time direction.

4. The apparatus according to claim 1, wherein the rest position of the highlighted portion corresponds to the position of the tile representing the earliest program on the first channel.

5. The apparatus according to claim 1, wherein the shifted position of the highlighted portion corresponds to the position of the second tile on the first channel before scrolling, when the user input is to navigate in a forwards time direction through the EPG.

6. The apparatus according to claim 1, wherein:
    the display generation unit is further configured to output data to include tiles representing said plurality of channels in the EPG; and
    the rest position of the highlighted portion corresponds to the position of the tile representing the first channel.

7. The apparatus according to claim 1, wherein:
    the display generation unit is further configured to output data to include an icon corresponding to a user input to navigate backwards in time through the EPG; and
    the shifted position of the highlighted portion corresponds to the position of said icon when the user input is to navigate in a backwards time direction through the EPG.

8. The apparatus according to claim 1, wherein the distance between the rest position and the shifted position is substantially the same as the distance between centers of neighboring tiles representing programs on a channel.

9. The apparatus according to claim 1, wherein:
    the display generation unit is further configured to output data to include tiles representing said plurality of channels in the EPG; and
    the rest position of the highlighted portion corresponds to the position of the first tile on the first channel, unless the previous user input was to navigate in a backwards time direction in the EPG, in which case the rest position of the highlighted portion corresponds to the position of the tile representing the first channel.

10. The apparatus according to claim 1, wherein the display generation unit is configured to output data to cause the tiles representing programs to scroll at a time that overlaps with shifting the highlighted portion from the rest position to the shifted position.

11. The apparatus according to claim 1, wherein the display generation unit is configured to output data to cause the tiles representing programs on the first channel to start to scroll substantially at the same time as the highlighted portion starts to be shifted from the rest position to the shifted position.

12. The apparatus according to claim 1, wherein the display generation unit is configured to output data to cause the shift of the highlighted portion from the rest position to the shifted position to be completed at substantially the same time as the tiles representing programs on the first channel have stopped scrolling.

13. The apparatus according to claim 1, wherein the display generation unit is configured to output data to cause the tiles representing programs on the first channel to start to scroll substantially at the same time as the highlighted portion starts to be returned back from the shifted position to the rest position.

14. The apparatus according to claim 1, wherein:
    the user input receiving unit is configured to receive an input to display the EPG; and
    the display generation unit is configured to output, upon receipt of the input to display the EPG via the user input receiving unit, data to generate an EPG in which the reference time is the current time.

15. The apparatus according to claim 1, further comprising a display device, wherein the display generation unit is configured to output the data to the display device to generate an EPG on the display device.

16. A television set comprising the apparatus according to claim 1.

17. A set-top box comprising the apparatus according to claim 1.

18. A method of generating an Electronic Program Guide (EPG), comprising:
generating an EPG that includes:
tiles representing scheduled programs for a plurality of channels, the tiles associated with each channel being arranged sequentially along a direction that represents moving forwards in time, the first tile associated with each channel representing a program that has a start time at or before a reference time and an end time after the reference time, wherein at least one start time of a first program on one channel is different from a start time of a first program on at least one other channel, and the other tiles associated with that channel representing subsequent programs;
the EPG further includes a highlighted portion for highlighting a tile of a first channel;
receiving a user input to navigate through the EPG in a forwards or backwards direction in increments of one tile; and
upon receipt of said user input:
shifting the highlighted portion in a direction in the EPG that corresponds to the user-selected forwards or backwards direction in increments of one tile from a rest position to a shifted position;
scrolling the tiles representing programs on the first channel along by one tile in the opposite direction to the user-selected forwards or backwards direction, and updating the tiles representing programs on the other channels displayed by the EPG based on the reference time being the start time of the program represented by the first tile on the first channel after scrolling; and
returning the highlighted portion back to the rest position after shifting the tiles representing programs on the first channel and updating the tiles representing programs on the other channels.

19. The method according to claim 18, wherein the step of updating the tiles representing programs on channels other than the first channel that are displayed by the EPG comprises, for each channel other than the first channel, either:
(i) scrolling each tile representing a program scheduled for a particular channel by an integer number of tiles in the opposite direction to the user-selected forwards or backwards time direction; or
(ii) leaving each tile representing a program scheduled for a particular channel stationary.

20. The method according to claim 18, comprising scrolling the tiles at a time that overlaps with shifting the highlighted portion from the rest position to the shifted position.

21. The method according to claim 18, comprising scrolling the tiles at a time that overlaps with returning the highlighted portion from the shifted position to the rest position.

22. The method according to claim 18 further comprising:
displaying the EPG on a display device.

23. A non-transitory computer-readable medium encoded with computer-readable instructions thereon that when executed by a computer cause the computer to perform a method comprising:
generating an Electronic Program Guide (EPG) that includes:
tiles representing scheduled programs for a plurality of channels, the tiles associated with each channel being arranged sequentially along a direction that represents moving forwards in time, the first tile associated with each channel representing a program that has a start time at or before a reference time and an end time after the reference time, wherein at least one start time of a first program on one channel is different from a start time of a first program on at least one other channel, and the other tiles associated with that channel representing subsequent programs;
the EPG further includes a highlighted portion for highlighting a tile of a first channel;
receiving a user input to navigate through the EPG in a forwards or backwards direction in increments of one tile; and
upon receipt of said user input:
shifting the highlighted portion in a direction in the EPG that corresponds to the user-selected forwards or backwards direction in increments of one tile from a rest position to a shifted position;
scrolling the tiles representing programs on the first channel along by one tile in the opposite direction to the user-selected forwards or backwards direction, and updating the tiles representing programs on the other channels displayed by the EPG based on the reference time being the start time of the program represented by the first tile on the first channel after scrolling; and
returning the highlighted portion back to the rest position after shifting the tiles representing programs on the first channel and updating the tiles representing programs on the other channels.

* * * * *